(12) United States Patent
Roosli et al.

(10) Patent No.: US 10,281,308 B2
(45) Date of Patent: May 7, 2019

(54) WATER FLOW AND LEAK DETECTOR

(71) Applicant: Honeywell International Inc., Morris Plains, NJ (US)

(72) Inventors: Philipp Roosli, Niantic, CT (US); John Tavares, Salem, CT (US); Ravi M. Sagar, East Lyme, CT (US); Brendan Donecker, East Lyme, CT (US)

(73) Assignee: Honeywell International Inc., Morris Plains, NJ (US)

( * ) Notice: Subject to any disclaimer, the term of this patent is extended or adjusted under 35 U.S.C. 154(b) by 107 days.

(21) Appl. No.: 15/183,611

(22) Filed: Jun. 15, 2016

(65) Prior Publication Data

US 2017/0363453 A1 Dec. 21, 2017

(51) Int. Cl.
*G01F 1/68* (2006.01)

(52) U.S. Cl.
CPC .............. *G01F 1/68* (2013.01); *Y02A 20/218* (2018.01)

(58) Field of Classification Search
CPC .................................. G01F 1/68; G01F 1/684
USPC .............. 73/204.11, 204.18, 204.22, 204.23, 73/204.25, 202.5, 1.17; 340/603
See application file for complete search history.

(56) References Cited

U.S. PATENT DOCUMENTS

| | | | |
|---|---|---|---|
| 3,151,484 A * | 10/1964 | Mohn et al. | G01K 1/14 136/221 |
| 5,637,789 A | 6/1997 | Lawson | |
| 7,076,373 B1 | 7/2006 | Munsterhuis et al. | |
| 2012/0180877 A1* | 7/2012 | Pallais | G01M 3/002 137/487.5 |
| 2016/0265955 A1* | 9/2016 | Easey et al. | G01F 1/6847 |

FOREIGN PATENT DOCUMENTS

CN 100565155 C 12/2009

OTHER PUBLICATIONS

Zou et al., "Pipeline Leakage Detection Using Fiber-Optic Distributed Strain and Temperature Sensors," OZ Optics Limited, White Paper, 7 pages, Oct. 31, 2014.

* cited by examiner

*Primary Examiner* — Lisa M Caputo
*Assistant Examiner* — Roger G Hernandez-Prewitt
(74) *Attorney, Agent, or Firm* — Seager, Tufte & Wickhem LLP

(57) ABSTRACT

A fluid flow detecting system and approach incorporating a collar configured to be clamped to a fluid conveyance mechanism, a temperature probe held within temperature sensing range of the fluid conveyance mechanism with the collar, an ambient temperature sensor, and a controller connected to the temperature probe and the ambient temperature sensor. The controller may incorporate a data analytics module to determine fluid flow starts, characteristics of fluid flows and fluid stops from temperatures received from the temperature probe and the ambient temperature sensor. The system may further incorporate a heater in contact with the fluid conveyance mechanism to increase speed and accuracy of determinations of fluid flow starts, characteristics of fluid flows and fluid stops by the data analytics module.

13 Claims, 4 Drawing Sheets

WATER FLOW AND LEAK DETECTOR

BACKGROUND

The present disclosure pertains to detectors and particularly to water type detectors.

SUMMARY

The disclosure reveals a fluid flow detecting system and approach incorporating a collar configured to be clamped to a fluid conveyance mechanism, a temperature probe held within temperature sensing range of the fluid conveyance mechanism with the collar, an ambient temperature sensor, and a controller connected to the temperature probe and the ambient temperature sensor. The controller may incorporate a data analytics module to determine fluid flow starts, characteristics of fluid flows and fluid stops from temperatures received from the temperature probe and the ambient temperature sensor. The system may further incorporate a heater in contact with the fluid conveyance mechanism to increase speed and accuracy of determinations of fluid flow starts, characteristics of fluid flows and fluid stops by the data analytics module.

DESCRIPTION

Figure 1:
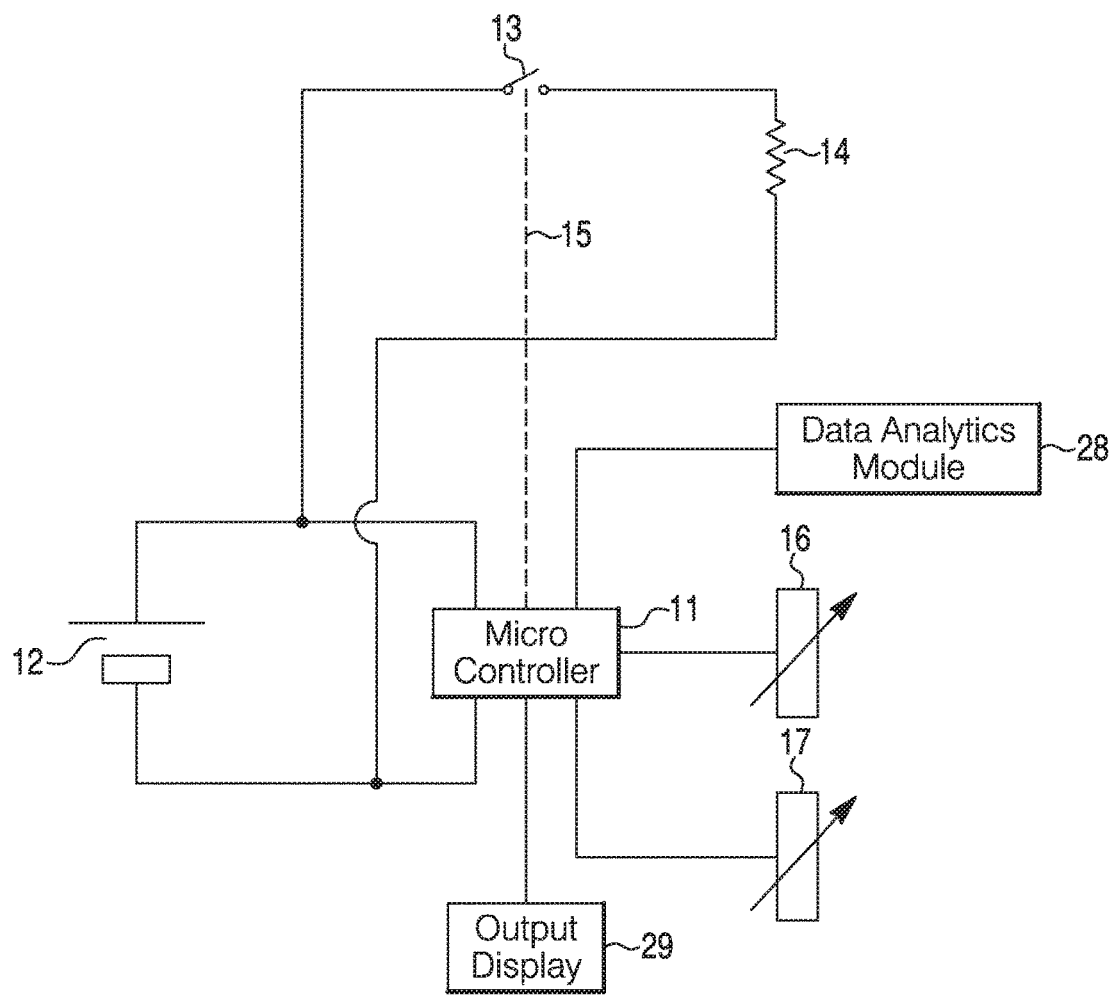
FIG. 1 is a diagram of a schematic of the present system and approach.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Water consumption and water conservation appear as important topics in many countries. Understanding patterns about how water is used and where there is water wastage caused by leaks may be an important element to manage a water consumption profile of dwellings. The present system and approach may target the water consumption and leakage detection of bathroom and kitchen appliances, such as toilets, showers, washing machines, water heaters, dishwashers, pipes and faucets.

A temperature sensor probe may be clamped to a water pipe. The temperature sensor may be connected to a small controller that regularly samples the water pipe temperature. A typical sampling interval ($t_I$) might be 15 seconds. When the water is turned On, the temperature of the pipe may change rapidly with a time constant $T_1$ of, for instance, about 10 seconds. As the water flows, the pipe may assume a secondary temperature. As the water is turned Off, the pipe may return to its primary stable temperature $T_0$ with a time constant of about 10 minutes. Performing edge detection in the time domain may allow a time-stamp when the water has been turned On and Off. For toilets, for example, one may detect when and how many times the flush-handle has been pressed (a duration of measuring $T_1$ may be a refill time of the tank and capture multi-flushes even if the tank was only partially filled).

One may add a resistive heater that is clamped on the opposite site of the temperature probe. Such a resistive heater may be for example a 100 ohm resistor that is operated with 10 volts. Another value for a resistor may be used instead. Occasionally, the controller may engage the resistor and track with a faster sampling rate with a characteristic temperature increase that the heating element creates. The rate of temperature may increase and the achievable new steady-state temperature $T_2$ may be correlated with water leaks. Even small drip rates around one drop per second may be detected. If this secondary drip-leak detection is taking place only a few times per week, this entire assembly may be kept battery operated.

The sensor may submit its sampled temperature data (potentially pre-processed to conserve transmit bandwidth and energy) to a server for further processing and roll-up reports. The temperatures $T_0$ and $T_1$ may be specific for each pipe that is being monitored. To avoid having to calibrate each sensor, one may use data analytics. In the time domain, one may track long-term trends of the $T_0$ and $T_1$ and the time constants when water flow is turned On and Off. One may also use data analytics to compare detectors in the same building to compensate for changes to the cold and hot water feeding pipes and general large scale impacts to $T_0$ and $T_1$.

Placing the heating element more or less across the temperature sensor may sense significantly the temperature gradient of laminar or slightly turbulent fluids which results in a better signal even with leaks as small as a few droplets per minute. The present system may let a sensing algorithm achieve a steady-state level and run a brief burst of heating action. The present system may be operated by batteries. Insulation is not necessarily needed as the present system may make a purely differential assessment.

If a building has many such sensors, one may provide a report to the engineering department to provide insight how a fine-distribution of water performs and to indicate which appliances that require maintenance (e.g., a water-leak severity-ranked list).

The low-cost sensor may also be used to track water conservation programs, such as when new toilet tanks or low-flow shower heads are installed. With a comparison of a-priori and a-posteriori information, the present system may document whether the efforts to conserve water change the usage patterns.

FIG. 1 is a diagram of a schematic of the present system and approach. A microcontroller 11 may be connected to an electric power source 12 such as a battery at the positive and minus voltage terminals. A switch 13 may have a first terminal connected to the positive terminal of battery 12. A first end of a heating resistor 14 may be connected to a second terminal of switch 13. A second end of resistor 14 may be connected to the negative terminal of battery 12. Switch 13 may connect and disconnect the first end of resistor 14 to and from the positive voltage terminal of battery 12. Switch 13 may be switched on and off, to connect or disconnect, respectively, the first end of resistor 14 to or from the positive voltage terminal, by controller 11 via a control line 15. Controller 11 may be connected to a data analytics module 28. Data analytics module 28 may be external of controller 11 or be within controller 11. Controller 11 may be connected to a display 29.

A pipe temperature sensor 16 may be connected to controller 11. Sensor 16 may vary in resistance with a change of temperature as sensed on a pipe. An ambient temperature sensor 17 may be connected to controller 11. Sensor 17 may vary in resistance with a change of ambient temperature. An output of determinations, such as for example fluid characteristics based in inputs from sensors 16 and 17, by controller 11 may be indicated on display 29. The fluid characteristics may indicate or imply information such as leaks in a pipe, or an associated or connected fluid system.

Figure 2:
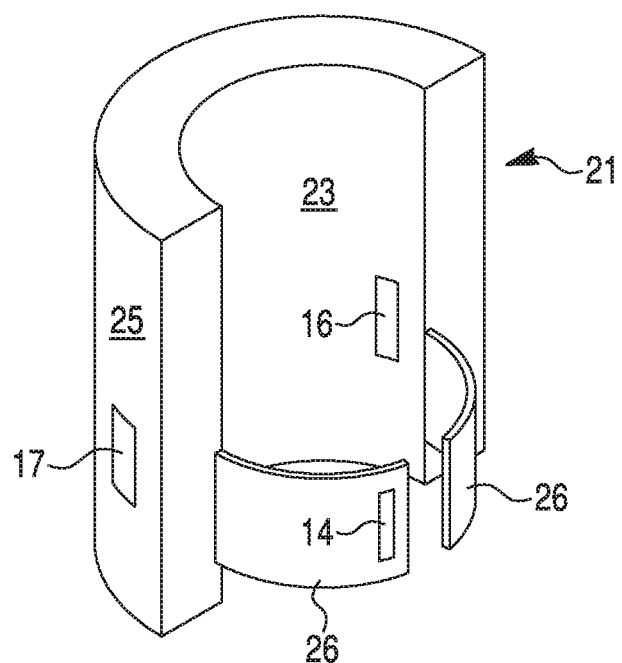
FIG. 2 is a diagram of a collar.
Figure 3:
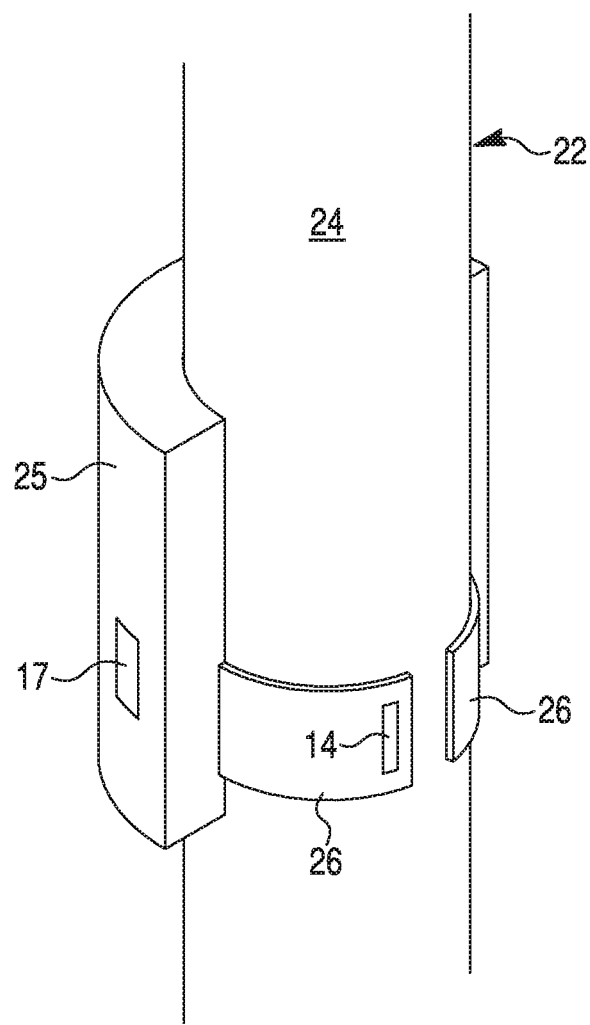
FIG. 3 is a diagram of the collar clamped on or attached to a pipe.

FIG. 2 is a diagram of a collar 21. Collar 21 may be clamped on or attached to a pipe 22 as illustrated in diagram of FIG. 3. Collar 21 may have situated at its inside surface 23 pipe temperature sensor 16. When collar 21 is clamped onto pipe 22, sensor 16 may be in contact with an external surface 24 of pipe 22 so as to detect a temperature of the pipe and fluid inside of pipe 22. On an outside surface 25 of collar 21 may be situated ambient temperature sensor 17. Sensor 17 may be thermally isolated from pipe 22 so that an accurate indication of temperature in the ambient space around pipe 22 may be determined. Temperature indications in terms of resistance from sensors 16 and 17 are provided to controller 11.

Collar 21 may attached to pipe 22 in various ways. One way may be with collar clamps 26 that hold collar 21 around pipe 22 so that good thermal contact is made between sensor 16 and outside surface 24 of pipe 22. On collar clamp 26 or an inside surface 23 may be heating resistor 14 attached so as to provide heat to pipe 22 and fluid inside pipe 22. Resistor 14 may be clamped at the opposite side of pipe 22 from sensor 16.

Figure 4:
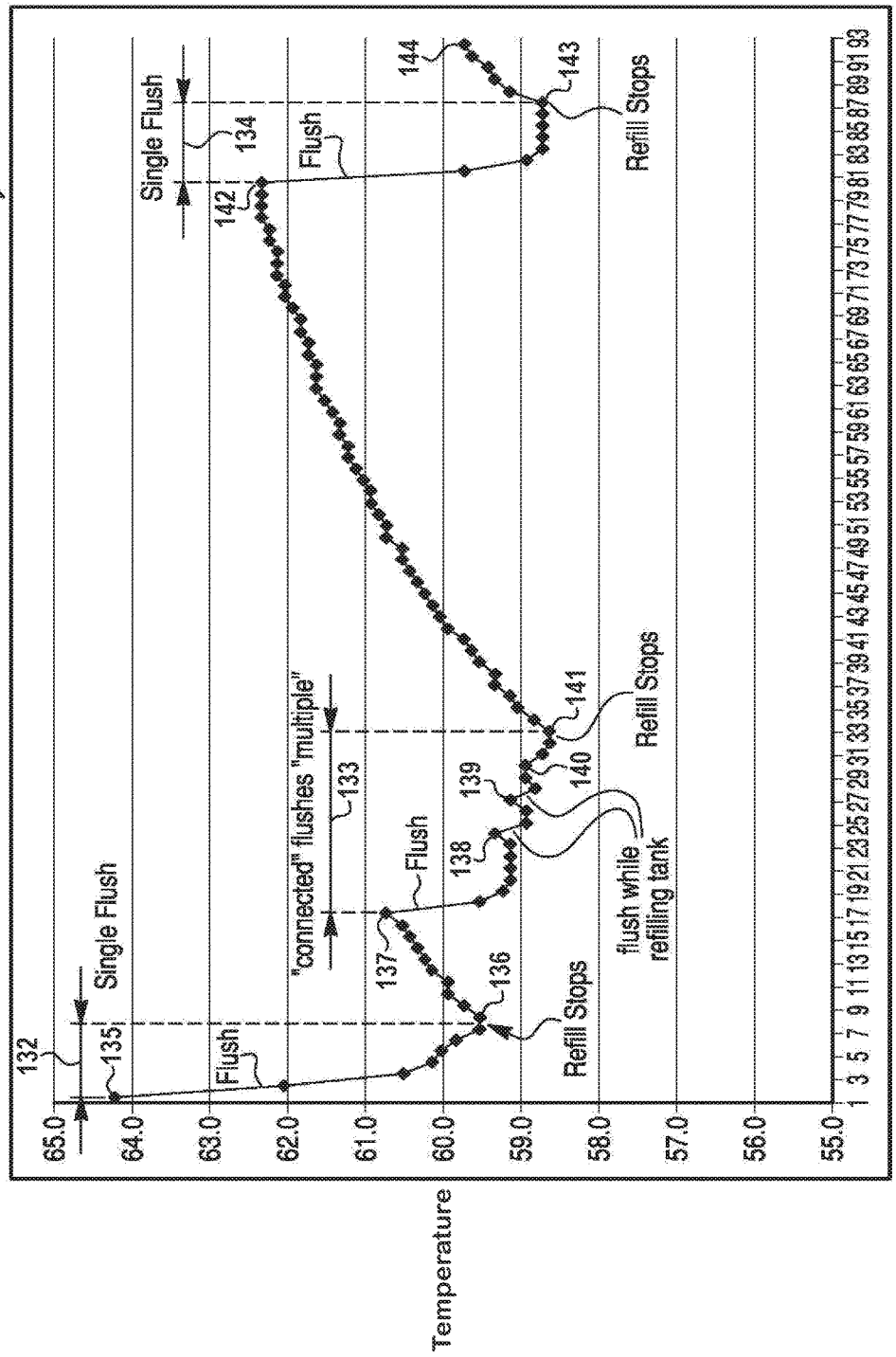
FIG. 4 is a diagram of a chart of temperature versus a number of samples over time.

FIG. 4 is a diagram of a chart 131 of temperature versus a number of samples over time that may be provided by the present fluid flow detection system and approach. Temperature may be shown in FIG. 4 in terms of degrees Fahrenheit (F) as indicated by sensor 16. Samples from 1 to about 8 may represent a single flush of a toilet as indicated by distance 132 and temperature drops from about 17.9 degrees Celsius (164.3 degrees F.) as cooler water flows through pipe 22 to a tank of the toilet. A refill of the tank of the toilet may stop at sample 9. The refill may begin when the toilet is first flushed. After a stop of the refill of the tank at the end of the flush, the temperature of pipe 22 as detected by sensor 16 may increase until the next flush at about sample 17. There may be a series of connected multiple flushes as indicated by distance 133. There may be one flush from about sample 17 through sample 20. There may be additional flushes starting at about samples 24, 27 and 30. Refilling of the tank may stop at about sample 33. Pipe 22 temperature may rise as indicated, from about sample 33 through sample 81. A single flush may be initiated at about sample 81. The flush may be indicated by a distance 134 of the samples. A refill of the toilet tank may stop at about sample 88. If the water stops flowing at sample 88, then the temperature of pipe 22 may increase after sample 88 as indicated by samples 89 through 93.

Points 35, 36, 37, 38, 39 and 40 may indicate samples 1, 8, 17, 24, 27 and 30, respectively. Points 41, 42, 43 and 44 may indicate samples 33, 81, 88 and 93, respectively.

To recap, a fluid flow detection system may incorporate a collar, a first temperature sensor situated on an inside surface of the collar, a second temperature sensor situated on an outside surface of the collar, and a controller having a first input connected to the first temperature sensor and a second input connected to the second temperature sensor. The collar may be configured to wrap around a fluid conveyance mechanism. The first temperature sensor may indicate a temperature at a location on an outside surface of the fluid conveyance mechanism. The second temperature sensor may indicate an ambient temperature in a vicinity of the collar and the fluid conveyance mechanism. The controller may go through a process to detect fluid flow starts, fluid flows and fluid stops received at the first and second inputs from the first and second sensors.

When a fluid begins to flow in the fluid conveyance mechanism, the first temperature sensor may detect a change of temperature at the outside surface of the fluid conveyance mechanism from a primary temperature and provide a signal representing the change of temperature to the controller that time stamps the change of temperature. The second temperature sensor may detect the ambient temperature in the vicinity of the collar and the fluid conveyance mechanism and send a signal representing the ambient temperature to the controller at the same time that the first temperature sensor provides signals representing temperature at the location on the outside surface of the fluid conveyance mechanism to the controller. As the fluid flows, the temperature at the outside surface of the fluid conveyance mechanism may assume a secondary temperature that is detected by the first temperature sensor and the signal representing the secondary temperature is sent to the controller. When the flow of the fluid is stopped, the temperature of the outside surface of the fluid conveyance mechanism may return to the primary temperature and a stop of the flow of fluid may be time-stamped by the controller in view of a signal from the first temperature representing a return of the temperature of the outside surface of the fluid conveyance mechanism to the primary temperature.

The controller may perform edge detection on the signals from the first and second temperature sensors to determine when a flow of the fluid in the fluid conveyance mechanism has been started and stopped.

The system may further incorporate a heater situated in the collar and configured to heat the outside surface of the fluid conveyance mechanism at 150 to 210 degrees opposite of a side from the first temperature sensor. Heat from the heater may increase a maximum sampling rate, and a steady state temperature.

The increase in a maximum sampling rate and steady state temperature, may increase a sensitivity of detection of a flow of fluid in the fluid conveyance mechanism.

The fluid conveyance mechanism may be a pipe. The fluid may be water.

The controller, the heater and the first and second temperature sensors may be powered by a source selected from a group having one or more batteries, solar cells, a wind powered generator, and line power.

An approach for detecting fluid flow may incorporate detecting a temperature at a surface of a fluid conveyance mechanism, taking one or more samples of the temperature over a duration of time, time-stamping one or more of the samples of the temperature over the duration of time, and analyzing one or more time stamped samples of the temperature over the duration of time to determine one or more characteristics of a fluid in the fluid conveyance mechanism. The one or more characteristics may incorporate a movement of the fluid in the fluid conveyance mechanism.

The approach may further incorporate placing a heating element on the fluid conveyance mechanism across from a location on the fluid flow mechanism where the detecting of the temperature occurs.

The fluid conveyance mechanism may be a pipe.

The fluid may be water.

A movement or a change of a rate of movement of the fluid may cause a change of the temperature detected at the surface of the fluid conveyance mechanism.

The change of temperature according to time stamped samples of the temperature over the duration of time may indicate an amount of flow of the fluid in the fluid conveyance mechanism.

If a flow of fluid begins in the fluid conveyance mechanism, the temperature at the surface of the fluid conveyance mechanism may go from a primary temperature to a secondary temperature. If the flow of the fluid stops in the fluid conveyance mechanism, the temperature at the surface of the fluid conveyance mechanism may go from the secondary temperature to the primary temperature.

A fluid flow detector may incorporate a collar configured to be clamped to a fluid conveyance mechanism, a temperature probe held within temperature sensing range of the fluid conveyance mechanism with the collar, an ambient temperature sensor, and a controller connected to the temperature probe and the ambient temperature sensor.

The controller may incorporate a data analytics module to determine fluid flow starts, and characteristics of fluid flows and fluid stops from temperatures received from the temperature probe and the ambient temperature sensor.

The detector may further incorporate a heater in contact with the fluid conveyance mechanism to increase speed and accuracy of determinations of fluid flow starts, and characteristics of fluid flows and fluid stops by the data analytics module.

The temperature probe may be in a thermal contact with the fluid conveyance mechanism.

The ambient temperature sensor may be situated on an external surface of the collar. The temperature probe may be situated on an internal surface of the collar.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A fluid flow detection system comprising:
a collar;
a first temperature sensor situated on an inside surface of the collar;
a second temperature sensor situated on an outside surface of the collar;
a controller having a first input connected to the first temperature sensor and a second input connected to the second temperature sensor; and
a heater situated in the collar and configured to heat the outside surface of the fluid conveyance mechanism at 150 to 210 degrees opposite from the first temperature sensor; and
wherein:
the collar is configured to wrap around a fluid conveyance mechanism;
the first temperature sensor indicates a temperature at a location on an outside surface of the fluid conveyance mechanism;
the second temperature sensor indicates an ambient temperature in a vicinity of the collar and the fluid conveyance mechanism; and
the controller goes through a process to detect fluid flow starts, fluid flows and fluid stops received at the first and second inputs from the first and second sensors.

2. The system of claim 1 wherein:
when a fluid begins to flow in the fluid conveyance mechanism, the first temperature sensor detects a change of temperature at the outside surface of the fluid conveyance mechanism from a primary temperature and provides a signal representing the change of temperature to the controller that time stamps the change of temperature;
the second temperature sensor detects the ambient temperature in the vicinity of the collar and the fluid conveyance mechanism and sends a signal representing the ambient temperature to the controller at the same time the first temperature sensor provides signals representing temperature at the location on the outside surface of the fluid conveyance mechanism to the controller;
as the fluid flows, the temperature at the outside surface of the fluid conveyance mechanism assumes a secondary temperature that is detected by the first temperature sensor and the signal representing the secondary temperature is sent to the controller; and
when the flow of the fluid is stopped, the temperature of the outside surface of the fluid conveyance mechanism returns to the primary temperature and a stop of the flow of fluid is time-stamped by the controller in view of a signal from the first temperature representing a return of the temperature of the outside surface of the fluid conveyance mechanism to the primary temperature.

3. The system of claim 2 wherein the controller performs edge detection on the signals from the first and second temperature sensors to determine when a flow of the fluid in the fluid conveyance mechanism has been started and stopped.

4. The system of claim 3, wherein heat from the heater increases a maximum sampling rate, and a steady state temperature.

5. The system of claim 4, wherein the increase in a maximum sampling rate and steady state temperature, increases a sensitivity of detection of a flow of fluid in the fluid conveyance mechanism.

6. The system of claim 5, wherein:
the fluid conveyance mechanism is a pipe; and
the fluid is water.

7. The system of claim 6, wherein the controller, the heater and the first and second temperature sensors are powered by a source selected from a group comprising one or more batteries, solar cells, a wind powered generator, and line power.

8. A method for detecting fluid flow comprising:
placing a collar about a surface of a fluid conveyance mechanism, the collar comprising:
a first temperature sensor situated on an inside surface of the collar;
a second temperature sensor situated on an outside surface of the collar;
and
a heater situated in the collar and configured to heat the outside surface of the fluid conveyance mechanism at 150 to 210 degrees opposite from the first temperature sensor;

detecting a temperature at a surface of the fluid conveyance mechanism with the first temperature sensor;

taking one or more samples of the temperature with the first temperature sensor over a duration of time;

time-stamping one or more of the samples of the temperature over the duration of time; and analyzing one or more time stamped samples of the temperature over the duration of time to determine one or more characteristics of a fluid in the fluid conveyance mechanism; and wherein the one or more characteristics comprise a movement of the fluid in the fluid conveyance mechanism.

9. The method of claim 8, wherein the fluid conveyance mechanism is a pipe.

10. The method of claim 9, wherein the fluid is water.

11. The method of claim 10, wherein a movement or a change of a rate of movement of the fluid can cause a change of the temperature detected at the surface of the fluid conveyance mechanism.

12. The method of claim 11, wherein the change of temperature according to time stamped samples of the temperature over the duration of time indicates an amount of flow of the fluid in the fluid conveyance mechanism.

13. The method of claim 12, wherein:
   if a flow of fluid begins in the fluid conveyance mechanism, the temperature at the surface of the fluid conveyance mechanism goes from a primary temperature to a secondary temperature; and
   if the flow of the fluid stops in the fluid conveyance mechanism, the temperature at the surface of the fluid conveyance mechanism goes from the secondary temperature to the primary temperature.

* * * * *